(12) United States Patent
Kuppam et al.

(10) Patent No.: US 12,536,025 B2
(45) Date of Patent: Jan. 27, 2026

(54) DYNAMIC ADJUSTMENT OF COMPONENTS RUNNING AS PART OF EMBEDDED APPLICATIONS DEPLOYED ON INFORMATION TECHNOLOGY ASSETS

(71) Applicant: Dell Products L.P., Round Rock, TX (US)

(72) Inventors: Pradeep Kuppam, Bangalore (IN); Raghavendra Prasad P C, Bangalore (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 537 days.

(21) Appl. No.: 18/140,041

(22) Filed: Apr. 27, 2023

(65) Prior Publication Data

US 2024/0362033 A1   Oct. 31, 2024

(51) Int. Cl.
*G06F 9/44* (2018.01)
*G06F 9/445* (2018.01)
*G06F 11/34* (2006.01)

(52) U.S. Cl.
CPC ...... *G06F 9/44521* (2013.01); *G06F 9/44505* (2013.01); *G06F 11/3409* (2013.01)

(58) Field of Classification Search
CPC .................................................. G06F 9/45521
USPC ....................................................... 719/331
See application file for complete search history.

(56) References Cited

U.S. PATENT DOCUMENTS

| 7,890,543 | B2 * | 2/2011 | Hunt ................. | G06F 9/465 |
| | | | | 707/999.1 |
| 7,996,814 | B1 * | 8/2011 | Qureshi ............. | G06N 5/048 |
| | | | | 717/172 |
| 8,949,140 | B2 * | 2/2015 | Liu ................... | G06F 8/60 |
| | | | | 705/348 |
| 2002/0128799 | A1 * | 9/2002 | Loecher ............ | G06Q 10/06 |
| | | | | 702/181 |
| 2021/0382754 | A1 * | 12/2021 | Nimmagadda ..... | G06N 3/08 |

OTHER PUBLICATIONS

Dell EMC, "Integrated Dell Remote Access Controller 9 User's Guide," Rev. A02, Dec. 2020, 363 pages.

(Continued)

*Primary Examiner* — Timothy A Mudrick
(74) *Attorney, Agent, or Firm* — Ryan, Mason & Lewis, LLP

(57) ABSTRACT

An apparatus comprises a processing device configured to provide telemetry data from a core component of a scalable embedded application deployed on an information technology asset to a support platform, the telemetry data being utilizable for determining a current state of the information technology asset. The processing device is also configured to receive and parse, at the core component of the scalable embedded application, a component definition data structure to identify a subset of additional components to be run on the scalable embedded application based at least in part on a predicted future state of the information technology asset. The processing device is further configured to dynamically adjust which of the additional components are run as part of the scalable embedded application based at least in part on the parsing of the component definition data structure.

20 Claims, 12 Drawing Sheets

(56) References Cited

OTHER PUBLICATIONS

Dell EMC, "The Integrated Dell Remote Access Controller 9 (IDRAC9) with Lifecycle Controller," https://i.dell.com/sites/doccontent/shared-content/data-sheets/en/Documents/idrac-spec-sheet.pdf, Apr. 6, 2017, 6 pages.
Dell EMC, "Secure Remote Services," Operations Guide, Release 3.38, REV 01, Aug. 2019, 166 pages.
Dell EMC, "Dell EMC PowerVault ME4 Series Storage," Specification Sheet, H17384, Nov. 2022, 6 pages.

\* cited by examiner

| CURRENT STATE | PREDICTED NEXT STATE | PROBABILITY |
|---|---|---|
| FAN FAILURE | PERFORMANCE DEGRADED BY 10% | 0.4 |
| FAN FAILURE | OVERHEAT OF CPU | 0.2 |

| FIELD | VALUE | DETAILS |
|---|---|---|
| NAME | REMOTE-SUPPORT | THIS IS THE COMPONENT NAME |
| TYPE | DEVICE-SPECIFIC | DEVICE-SPECIFIC; THIS COMPONENT MUST BE IN THE DEVICE |
| DEPENDENCIES | MESSAGE-BUS | THIS COMPONENT NEEDS THE MESSAGE-BUS COMPONENT |

DYNAMIC ADJUSTMENT OF COMPONENTS RUNNING AS PART OF EMBEDDED APPLICATIONS DEPLOYED ON INFORMATION TECHNOLOGY ASSETS

FIELD

The field relates generally to information processing, and more particularly to management of information processing systems.

BACKGROUND

As the value and use of information continues to increase, individuals and businesses seek additional ways to process and store information. Information handling systems and other types of information processing systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems.

SUMMARY

Illustrative embodiments of the present disclosure provide techniques for dynamic adjustment of components running as part of embedded applications deployed on information technology assets.

In one embodiment, an apparatus comprises at least one processing device comprising a processor coupled to a memory. The at least one processing device is configured to provide telemetry data from a core component of a scalable embedded application deployed on an information technology asset to a support platform, the telemetry data being utilizable for determining a current state of the information technology asset, the scalable embedded application being configured to run the core component and one or more additional components. The at least one processing device is also configured to receive, at the core component of the scalable embedded application deployed on the information technology asset from the support platform, a component definition data structure. The at least one processing device is further configured to parse the component definition data structure to identify a subset of the one or more additional components to be run on the scalable embedded application based at least in part on a predicted future state of the information technology asset, the predicted future state of the information technology asset being determined based at least in part on the determined current state of the information technology asset, and to dynamically adjust which of the one or more additional components are run as part of the scalable embedded application based at least in part on the parsing of the component definition data structure.

These and other illustrative embodiments include, without limitation, methods, apparatus, networks, systems and processor-readable storage media.

BRIEF DESCRIPTION OF THE DRAWINGS

FIG. 6 shows a table of predicted states for an information technology asset in an illustrative embodiment.

FIG. 8 shows a table illustrating characteristics of a component definition for a component of a scalable embedded enterprise application in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
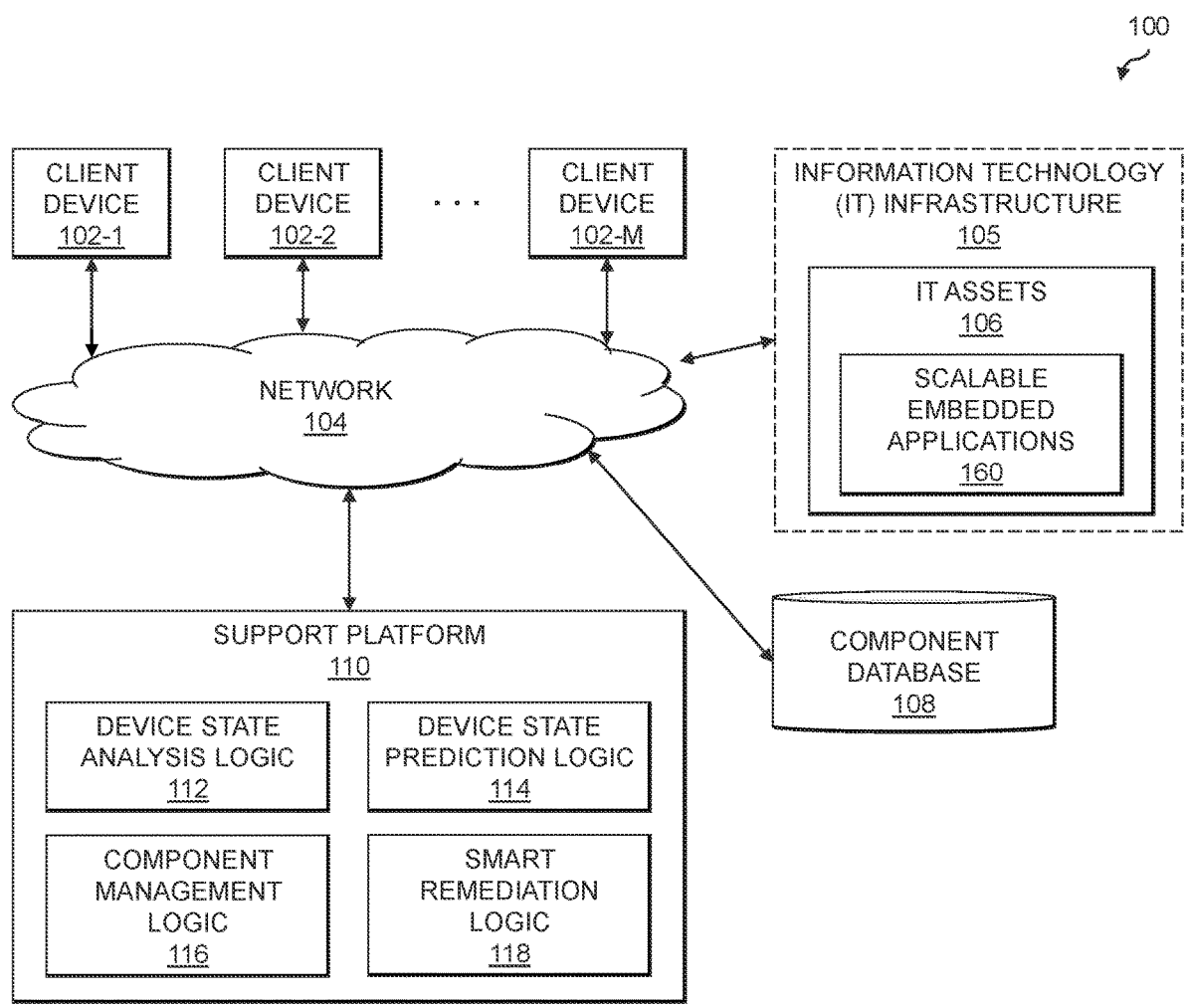
FIG. 1 is a block diagram of an information processing system configured for dynamic adjustment of components running as part of embedded applications deployed on information technology assets in an illustrative embodiment.

FIG. 1 shows an information processing system 100 configured in accordance with an illustrative embodiment. The information processing system 100 is assumed to be built on at least one processing platform and provides functionality for dynamically scaling the footprint of applications embedded on information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106 running scalable embedded applications 160, a component database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing its assets (e.g., IT assets 106 in the IT infrastructure 105, where the scalable embedded applications 160 are controlled or operated by the enterprise and thus may be referred to as embedded enterprise applications). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities). In other embodiments, the support platform 110 may be operated by an enterprise that is a hardware or software vendor of assets (e.g., IT assets 106 in the IT infrastructure 105, the client devices 102).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The component database 108 is configured to store and record various information that is utilized by the support platform 110 and the scalable embedded applications 160 for dynamically scaling the footprint of the scalable embedded applications 160. The component database 108, for example, may store various device-specific and/or device-independent components which may be deployed and run on the scalable embedded applications 160 on an as-needed basis, with the need being determined by the support platform 110 as described in further detail below. The component database 108 may also store mappings between device or asset states and corresponding ones of the device-specific and/or device-independent components which should run based on the device or asset states of the IT assets 106. The component database 108 may also store telemetry data collected from hardware and/or software components of the IT assets 106 (and possibly ones of the client devices 102), state asset maps, maps between asset states and troubleshooting/remediation actions to be taken, etc. as will be described in further detail below. In some embodiments, one or more of the storage systems utilized to implement the component database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

In some embodiments, the client devices 102 are assumed to be associated with system administrators, IT managers or other authorized personnel responsible for managing the IT assets 106 of the IT infrastructure 105. For example, a given one of the client devices 102 may be operated by a user to access a graphical user interface (GUI) provided by the support platform 110 to manage one or more of the IT assets 106 of the IT infrastructure 105. The support platform 110 may be provided as a cloud service that is accessible by the given client device 102 to allow the user thereof to manage one or more of the IT assets 106 of the IT infrastructure 105 (e.g., to manage the scalable embedded applications 160 running thereon, such as taking actions via the scalable embedded applications 160 to troubleshoot and/or remediate issues occurring on the IT assets 106). In some embodiments, the IT assets 106 of the IT infrastructure 105 are owned or operated by the same enterprise that operates the support platform 110 (e.g., where an enterprise such as a business provides support for the assets it operates). In other embodiments, the IT assets 106 of the IT infrastructure 105 may be owned or operated by one or more enterprises different than the enterprise which operates the support platform 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding their current state (e.g., hardware telemetry data, software telemetry data, etc.) which may be used for determining whether and how to scale the footprint of the scalable embedded applications 160 (e.g., to determine whether to add and/or remove components from the scalable embedded applications 160). The host agents may also be configured to receive, from the support platform 110, instructions for performing troubleshooting and/or remediation actions on the IT assets 106. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements device state analysis logic 112, device state prediction logic 114, component management logic 116 and smart remediation logic 118. The scalable embedded applications 160 are configured to provide telemetry data from core components thereof to the support platform 110. The device state analysis logic 112 is configured to utilize the telemetry data to determine current states of the IT assets 106 on which the scalable embedded applications 160 run. The device state prediction logic 114 is configured to predict future states of the IT assets 106 based at least in part on the determined current states of the IT assets. The component management logic 116 is configured to generate component definition data structures which specify which of a plurality of additional components should be run on different ones of the scalable embedded applications 160 based at least in part on the predicted future states of the IT assets 106. The smart remediation logic 118 is configured to provide the component definition data structures to the scalable embedded applications 160 running on the IT assets 106. The scalable embedded applications 160 are configured to parse such component definition data structures to identify the additional components to be run, and dynamically adjust which of the additional components which are run on the scalable embedded applications 160 accordingly.

It is to be appreciated that the particular arrangement of the client devices 102, the IT infrastructure 105 and the support platform 110 illustrated in the FIG. 1 embodiment is presented by way of example only, and alternative arrangements can be used in other embodiments. As discussed above, for example, the support platform 110 (or portions of components thereof, such as one or more of the device state analysis logic 112, the device state prediction logic 114, the component management logic 116 and the smart remediation logic 118) may in some embodiments be implemented internal to one or more of the client devices 102 and/or the IT infrastructure 105 (e.g., via host agents running on the client devices 102 and/or the IT assets 106 of the IT infrastructure 105).

At least portions of the device state analysis logic 112, the device state prediction logic 114, the component management logic 116 and the smart remediation logic 118 may be implemented at least in part in the form of software that is stored in memory and executed by a processor.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the component database 108 and the support platform 110 or components thereof (e.g., the IT assets 106, the device state analysis logic 112, the device state prediction logic 114, the component management logic 116 and the smart remediation logic 118) may be implemented on respective distinct processing platforms, although numerous other arrangements are possible. For example, in some embodiments at least portions of the support platform 110 and one or more of the client devices 102, the IT infrastructure 105 and/or the component database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the component database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 11 and 12.

It is to be appreciated that these and other features of illustrative embodiments are presented by way of example only, and should not be construed as limiting in any way.

It is to be understood that the particular set of elements shown in FIG. 1 for dynamic adjustment of components running as part of the scalable embedded applications 160 deployed on the IT assets 106 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for dynamic adjustment of components running as part of embedded applications deployed on information technology assets will now be described in more detail with reference to the flow diagram of FIG. 2. It is to be understood that this particular process is only an example, and that additional or alternative processes for dynamic adjustment of components running as part of embedded applications deployed on information technology assets may be used in other embodiments.

In this embodiment, the process includes steps 200 through 206. These steps are assumed to be performed by the support platform 110 utilizing the device state analysis logic 112, the device state prediction logic 114, the component management logic 116 and the smart remediation logic 118. The process begins with step 200, providing telemetry data from a core component of a scalable embedded application (e.g., one of the scalable embedded applications 160) deployed on an IT asset (e.g., one of the IT assets 106) to a support platform (e.g., support platform 110). The telemetry data is utilizable for determining a current state of the IT asset. The scalable embedded application is configured to run the core component and one or more additional components. The scalable embedded application may comprise an enterprise application deployed by an enterprise operating the support platform, the enterprise application providing support services for the IT asset. The scalable embedded application may be deployed on one or more hardware components of the IT asset having a separate storage space. The telemetry data may be provided in step 200 at least one of: at regular intervals; and in response to an alert triggered by the scalable embedded application or the support platform. The current state of the IT asset may be further determined based at least in part on at least one of: one or more alerts generated by at least one of the scalable embedded application and the support platform; and information regarding historical issues encountered on a plurality of IT assets stored in a support database.

In step 202, the core component of the scalable embedded application deployed on the IT asset receives, from the support platform, a component definition data structure. The component definition data structure is parsed in step 204 to identify a subset of the one or more additional components to be run on the scalable embedded application based at least in part on a predicted future state of the IT asset. The predicted future state of the IT asset may be determined based at least in part on the determined current state of the IT asset. The predicted future state of the information technology asset may be generated based at least in part using a Markov chain characterizing transitions between states based at least in part on the current state of the IT asset and one or more previous states of the IT asset. The component definition data structure may be in a JavaScript Object Notation (JSON) format. The component definition data structure may specify, for each component in the subset of the one or more additional components to be run on the scalable embedded application: a component name; component type; and component dependencies. The component type of a given component may comprise one of: a device-specific component type that must be run on the scalable embedded application deployed on the IT asset; and a device-independent component type that may be run external to the IT asset.

Figure 2:
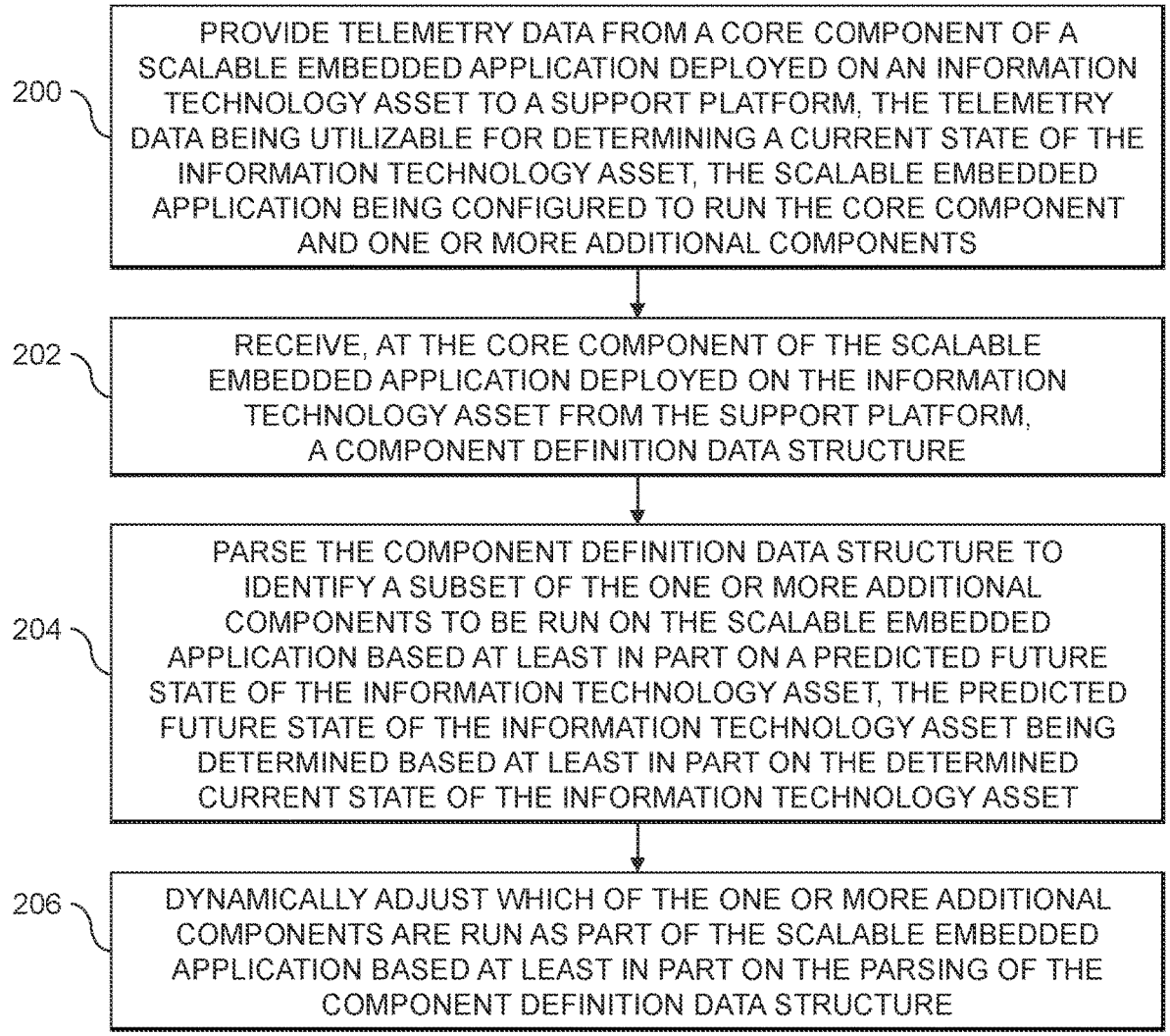
FIG. 2 is a flow diagram of an exemplary process for dynamic adjustment of components running as part of embedded applications deployed on information technology assets in an illustrative embodiment.

The FIG. 2 process continues with step 206, dynamically adjusting which of the one or more additional components are run as part of the scalable embedded application based at least in part on the parsing of the component definition data structure. Step 206 may comprise downloading device-specific ones of the identified one or more additional components which are not already running as part of the scalable embedded application, and running the device-specific ones of the identified one or more additional components as part of the scalable embedded application. The device-specific ones of the identified one or more additional components which are not already running as part of the scalable embedded application may be downloaded from one or more edge computing devices coupled between the IT asset and the support platform. Step 206 may comprise running device-independent ones of the identified one or more additional components at an additional IT asset. The additional IT asset may comprise one or more edge computing devices coupled between the IT asset and the support platform. Step 206 may also or alternatively comprise uninstalling one or more of the identified one or more additional components currently running as part of the scalable embedded application which are not specified in the component definition data structure.

Data centers and other types of IT infrastructure include various IT assets, including but not limited to servers, storage systems, networking equipment (e.g., routers, switches, etc.), etc. Organizations use various IT assets to build data centers or other IT infrastructure capable of assembling, processing and storing enormous amounts of data. A company, organization, enterprise or other entity may utilize services provided by a data center or IT infrastructure to serve customer or other end-user requests. Edge computing is a distributed computing model in which computing takes place near the physical location where data is being collected and analyzed. Edge computing facilitates several important advantages over large-scale, centralized facilities. Illustrative embodiments provide technical solutions for efficiently making use of edge computing devices to download device-independent and device-specific components of applications and other software, and to store such components in a data store such that computing devices which are connected to the edge computing devices can fetch only the device-specific components needed for a particular use case from the edge computing devices on an as-needed basis.

Enterprise applications may be embedded in IT assets in the factory or at another location before the IT assets are deployed for use by end-users. For example, a hardware or software vendor may embed enterprise applications (e.g., Integrated Dell Remote Access Controller (iDRAC), Dell SupportAssist, etc.). These embedded enterprise applications may be configured to monitor the health of IT assets, and enable connectivity to an enterprise back-end or support platform. Functionality of the embedded enterprise applications include, but is not limited to, sending telemetry data (e.g., events and payloads) at regular intervals, providing remote support services, downloading system patches, enabling the execution of troubleshooting and remediation scripts, etc. These various functionalities may be achieved by different components which are bundled as one single, large monolithic application. Such large monolithic applications have various drawbacks, including storage space constraints and IT asset resource constraints.

IT assets may include hardware or components with a separate storage space (e.g., Dell PowerVault, iDRAC, etc.) inside a chip to embed various applications. To embed applications inside such hardware or components, there are restrictions for each embedded application to have a low storage footprint (e.g., to fit on the limited storage space provided by such hardware or components for embedded applications). Monolithic applications (e.g., executables, binaries, etc.) with increased storage footprints face limited storage space constraints, and it is thus challenging to embed such monolithic applications in the available storage space. IT assets may also have limited system resources. Running large embedded monolithic applications consumes various system resources, such as processing (e.g., central processing unit (CPU)) resources, memory resources, networking resources, etc. These applications are not device context aware, and are embedded as monolithic applications even though some application components may not be required to be run at all times in a particular IT asset. Further, some device-independent components of an application may not be required to be copied or installed in certain IT assets at all. The technical solutions described herein provide a framework for automatically determining application components which are to be made available in different IT assets based on predictive IT asset health.

Figure 3:
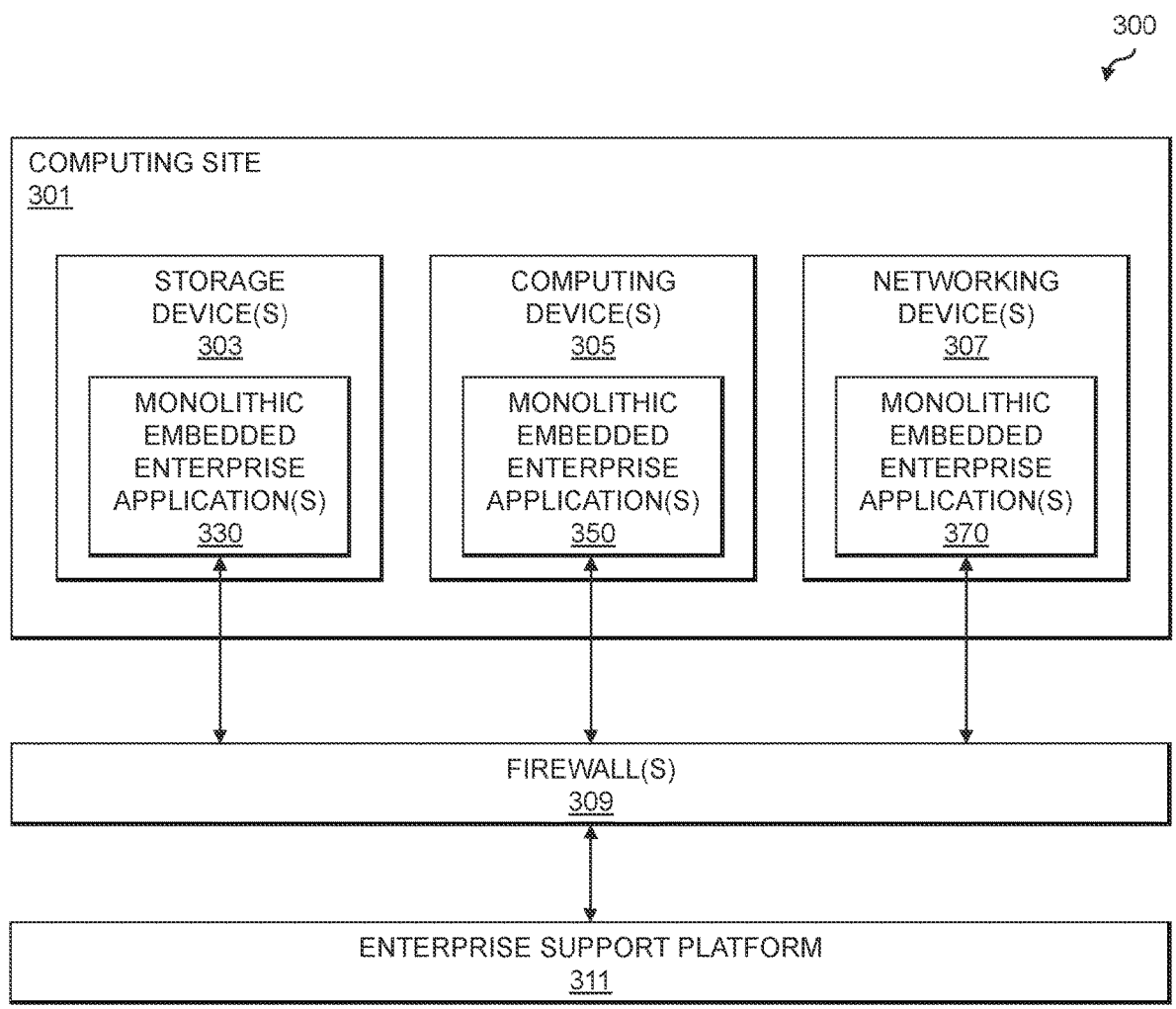
FIG. 3 shows a system configured with monolithic embedded enterprise applications in an illustrative embodiment.

FIG. 3 shows a system 300 including a computing site 301 (e.g., a factory, customer premises, etc.) in which a set of storage devices 303, computing devices 305 and networking devices 307 are deployed. The storage devices 303, computing devices 305 and networking devices 307 are all examples of what are more generally referred to herein as IT assets. The storage devices 303 run monolithic embedded enterprise applications 330, the computing devices 305 run monolithic embedded enterprise applications 350, and the networking devices 307 run monolithic embedded applications 370. The monolithic embedded enterprise applications 330, 350 and 370 communicate with an enterprise support platform 311 via one or more optional firewalls 309. Such communication may involve, for example, sending telemetry data, providing remote support services, downloading system patches, executing troubleshooting and/or remediation scripts, etc.

The technical solutions described herein provide an intelligent framework (e.g., at enterprise premises, such as an enterprise support platform) which enables scalable embedded enterprise applications. The framework is configured to determine the system states of IT assets, to predict the future system states of the IT assets, to determine necessary components of the scalable embedded enterprise applications based on the predicted future system states, and to provide component definitions for such necessary components to the scalable embedded enterprise applications running on the IT assets. Based on such component definitions, the scalable embedded enterprise applications are configured to download components (e.g., from the enterprise support platform, for edge computing devices at or near to the computing site where the IT assets are deployed, etc.) on an as-needed basis. The technical solutions thus extend the capabilities of embedded enterprise applications. At customer or end-user premises (e.g., a computing site where IT assets are deployed), a core component of a scalable embedded enterprise application running on a given IT asset is configured to read the component definitions provided by the enterprise support platform, and to download the necessary components to the given IT asset. This may involve communication with one or more edge computing devices (e.g., which are located at or within the computing site where the given IT asset is deployed, or which are located closer to the computing site where the IT assets are deployed than the enterprise support platform). In this way, the scalable embedded enterprise applications are able to copy device—or asset-specific components to different IT assets. Such components may also be removed from the IT assets after use when no longer needed.

Figure 4:
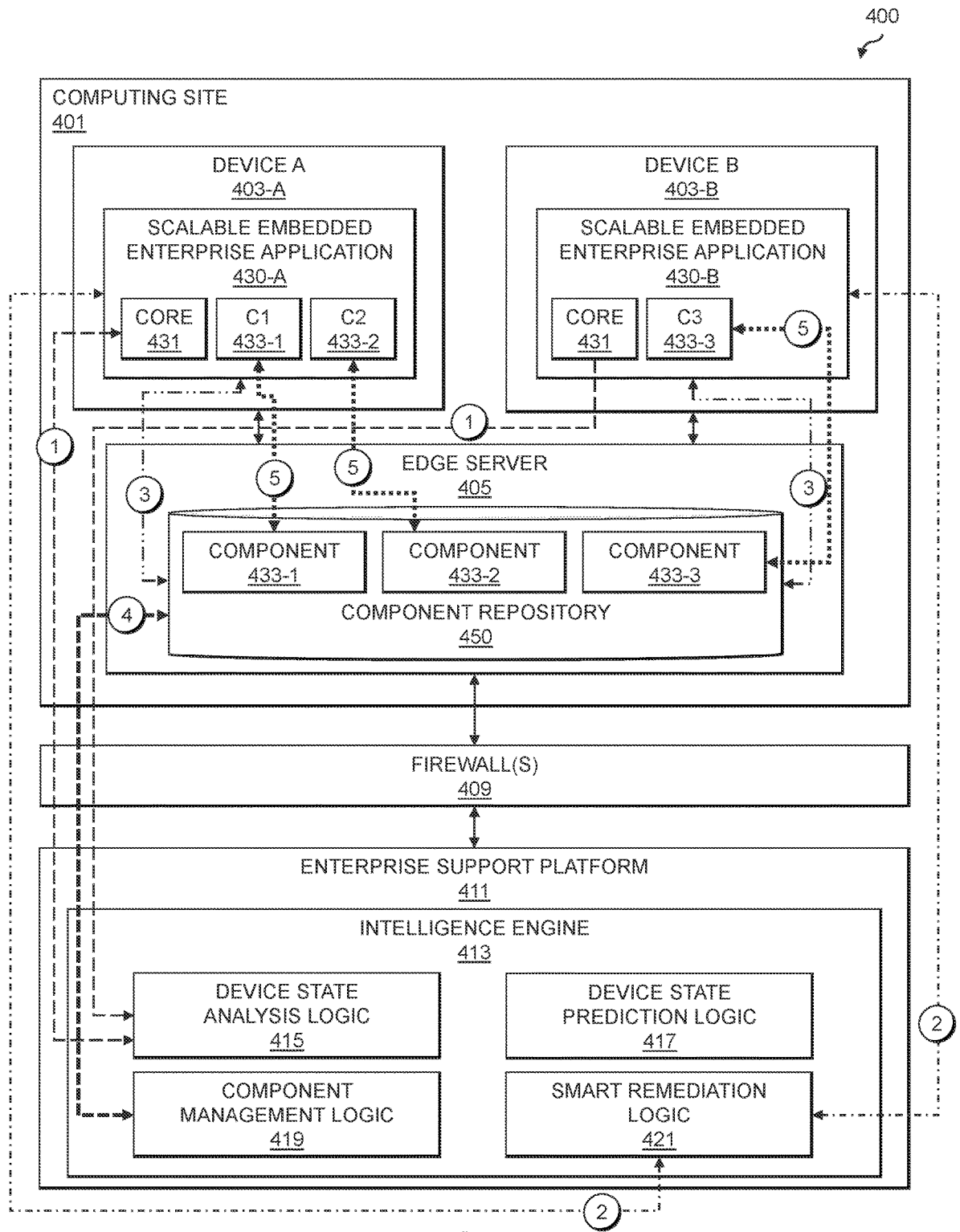
FIG. 4 shows a system configured for dynamic scaling of footprints of embedded enterprise applications in an illustrative embodiment.

FIG. 4 shows a system 400 including a computing site 401 (e.g., a factory, customer premises, etc.) including devices 403-A and 403-B (collectively, devices 403) running scalable embedded enterprise applications 430-A and 430-B (collectively, scalable embedded enterprise applications 430). The devices 403 are examples of what are more generally referred to herein as IT assets. Also deployed at the computing site 401 is an edge server 405 implementing a component repository 450. The scalable embedded enterprise applications 430 running on the devices 403 are configured to communicate, via one or more optional firewalls 409, with an enterprise support platform 411 implementing an intelligence engine 413. The intelligence engine 413 implements device state analysis logic 415, device state prediction logic 417, component management logic 419 and smart remediation logic 421. Each of the scalable embedded enterprise applications 430 implements a core 431, which is configured to report telemetry data or other information in step 1 to the device state analysis logic 415 of the intelligence engine 413 of the enterprise support platform 411. The device state analysis logic 415 uses such information to determine the current states of the devices 403. Based on the current states of the devices 403 (and possibly other information, such as a history of previous states, provided telemetry data, a support database, etc.), the device state prediction logic 417 predicts the next one or more future states of the devices 403. The smart remediation logic 421 in step 2 provides one or more messages which are pushed to the scalable embedded enterprise applications 430. Such messages may include component definitions for scalable components (e.g., components 433-1, 433-2, 433-3, etc.) which are needed by the respective instances of the scalable embedded enterprise applications 430 based on the predicted future states of their associated devices 403. In step 3, the scalable embedded enterprise applications 430 communicate with the edge server 405 and indicate which dependent components are needed. For scalable embedded enterprise application 430-A running on device 403-A, the needed components include components 433-1 and 433-2. For scalable embedded enterprise application 430-B running on device 403-B, the needed components include component 433-3. If a needed component is not already available in the component repository 450, the edge server in step 4 may communicate with the component management logic 419 of the intelligence engine 413 to download the dependencies. The needed components are then downloaded from the component repository 450 to the scalable embedded enterprise applications 430 in step 5.

In some embodiments, the technical solutions operate in four stages: (1) determining the current state of the devices 403; (2) predicting the next or future states of the devices 403; (3) real-time creation of component definitions; and (4) device-context optimization of an embedded application footprint, including smart expansion and reduction of the footprint to optimize resource usage by the devices 403.

Figure 5:
FIG. 5 shows a table illustrating a current state of an information technology asset in an illustrative embodiment.

In stage (1), device telemetry information for the devices 403 is sent by one or more asset management and monitoring applications (e.g., the cores 431 of the scalable embedded enterprise applications 430) to the enterprise support platform 411, more particularly to the device state analysis logic 415 of the intelligence engine 413. The device telemetry information may be sent at regular intervals, in response to alerts being triggered from the devices 403 to the enterprise support platform 411, etc. The intelligence engine 413 uses the device state analysis logic 415 to determine the current states of the devices 403 using collated device telemetry information, alerts, a support database, etc. FIG. 5 shows a table 500 of collated data for a given device, including date, customer number, a component where an alert is generated, and transition states that the device has went through until a current time.

In stage (2), the collated data collected in stage (1) is used by the device state prediction logic 417 to predict the next states of the devices 403. In some embodiments, the predictions are generated using Markov chains. The device state prediction logic 417 is configured to proactively determine if one or more of the devices 403 have issues which may lead to device failure. A Markov chain is a mathematical system that understands the transitions from one state to another (e.g., device state transitions of the devices 403) according to probabilistic rules. This is used to calculate the probability of an event (e.g., a next state) by considering the current state and the previous state. The most probable next state is considered for remediation processing. FIG. 6 shows a table 600 of an example of device state prediction based on current state.

Figure 7:
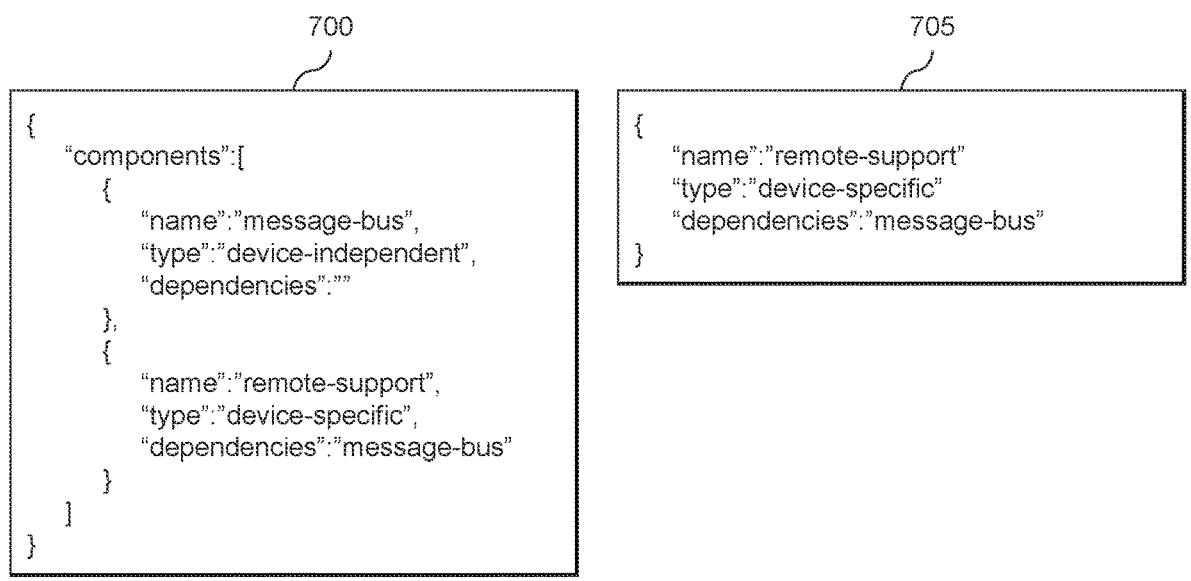
FIG. 7 shows examples of component definitions for a scalable embedded enterprise application in an illustrative embodiment.

In stage (3), the component management logic 419 and the smart remediation logic 421 is configured for real-time creation of component definitions for respective ones of the devices 403 based on their future states predicted in stage (2). Based on the severity of the predicted states and the device configurations of the devices 403, required components are identified by the component management logic 419. The component management logic 419 creates component definitions which specify the required components and their respective types and dependencies. The component types include device-independent and device-specific components. Device-independent components can be implemented in a centralized server (e.g., the enterprise support platform 411, the edge server 405). Device-specific components must be implemented internal to the devices 403 (e.g., on the scalable embedded enterprise applications 430). FIG. 7 shows an example 700 of a component definition, as well as an example 705 of a sample component. FIG. 8 shows a table 800 of a component definition for the sample component in the example 705. The table 800 includes fields such as name, type and dependencies, as well as corresponding values and details. The real-time generated component definitions are sent by the smart remediation logic 421 to the cores 431 implemented on the scalable embedded enterprise applications 430.

In stage (4), device-context optimization of the footprints of the scalable embedded enterprise applications 430 is performed. This includes smart expansion and reduction of the footprints of the scalable embedded enterprise applications 430 in order to optimize resource usage. Once the cores 431 of the scalable embedded enterprise applications 430 (e.g., which may be embedded in a factory where the devices 403 are produced) receive the component definitions from the smart remediation logic 421, the cores 431 parse the component definitions to understand the needed components for the different instances of the scalable embedded enterprise applications 430. In some embodiments, the component definitions utilize a JavaScript Object Notation (JSON) format. The cores 431 then communicate with the edge server 405 to obtain the required components. The edge server 405 checks if the required components are available in its component repository 450. If the required components are already available in the component repository 450, such components are downloaded to the scalable embedded enterprise applications 430 from the component repository 450. If the required components are not already available in the component repository 450, the edge server 405 communicates with the component management logic 419 to obtain the required components, which are then stored in the component repository 450 and downloaded therefrom to the scalable embedded enterprise applications 430. It should be noted that the cores 431 only need to fetch the device-specific components from the edge server 405. Any device-independent components which are needed may remain running at the edge server 405, or at the enterprise support platform 411. The device-specific components communicate to their dependent components, which may be device-independent or device-specific components based on the component definitions.

Figure 9:
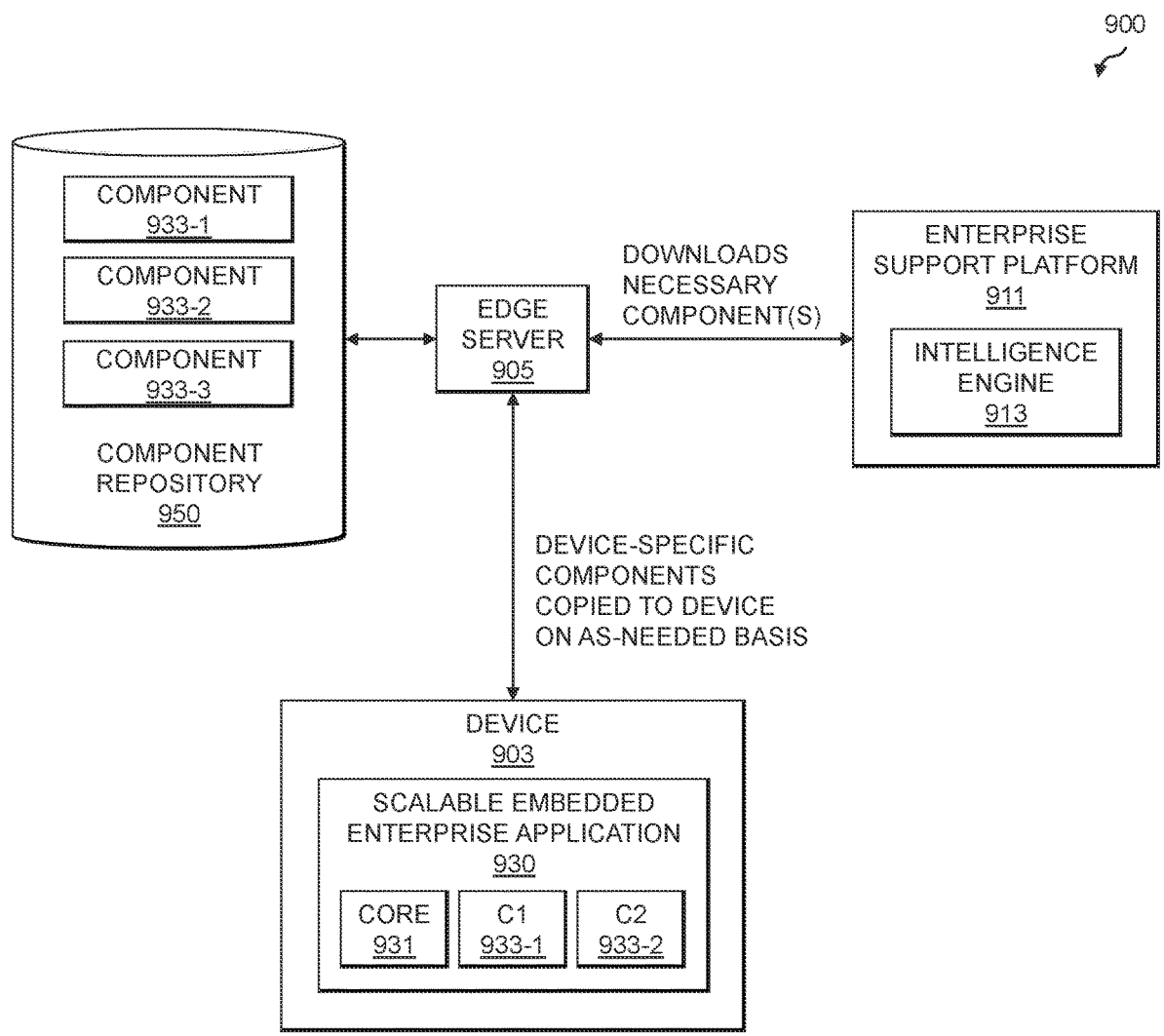
FIG. 9 shows a system including a device running a scalable embedded enterprise application which downloads device-specific components for the scalable embedded enterprise application on an as-needed basis in an illustrative embodiment.

FIG. 9 shows a system 900 illustrating smart expansion of the footprint of a scalable embedded enterprise application 930 running on a device 903. The scalable embedded enterprise application 930 includes a core 931, which downloads device-specific components 933-1 and 933-2 from an edge server 905. The edge server 905 is associated with a component repository 950 storing various components 933-1, 933-2, 933-3, etc. The edge server 905 downloads necessary components (e.g., for storage in the component repository 950) from an enterprise support platform 911 implementing an intelligence engine 913 (e.g., similar to the intelligence engine 413 described above).

Consider, as an example a "remote support" component which is a device-specific component. The remote support component is needed by a technical support (TS) team for troubleshooting issues occurring on the device 903. The remote support component enables the TS team to remotely login to the device 903 and execute scripts/commands to troubleshoot and remediate the issues. The remote support component is downloaded by the edge server 905 and copied to the device 903 as per a component definition supplied by the intelligence engine 913 (e.g., smart remediation logic thereof) to the core 931 of the scalable embedded enterprise application 930. Once any issues are resolved (e.g., as per updated device telemetry received from the device 903, a support database, etc.), the smart remediation logic of the intelligence engine 913 will send a message to the core 931 indicating that the remote support component is no longer needed. The core 931 can then remove or uninstall the remote support component from the scalable embedded enterprise application 930 to reduce its footprint. As only the bare minimum device-specific components (as well as the core 931) are running on the scalable embedded enterprise application 930 of the device 903, the system resources consumed by the scalable embedded enterprise application 930 are reduced. This helps to optimize use of storage space of the device 903, as well as resource consumption in the customer environment as device-specific components are downloaded, copied/installed and run on the scalable embedded enterprise application 930 on an as-needed basis. Once a device-specific component is no longer needed, it can be removed/uninstalled from the scalable embedded enterprise application 930 to save storage space and optimize system resources.

Figure 10:
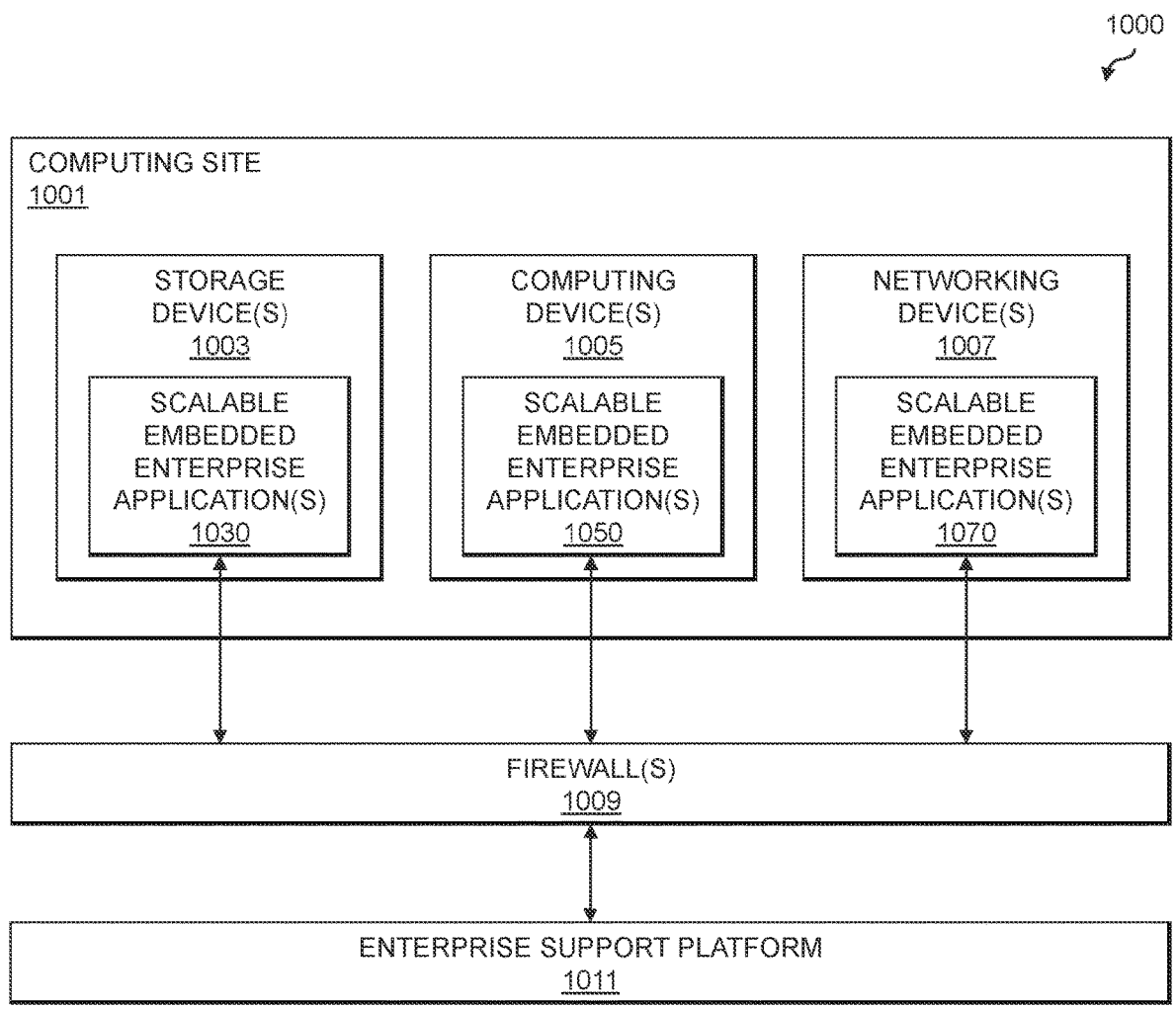
FIG. 10 shows a system including devices at a computing site which are configured with scalable embedded enterprise applications in an illustrative embodiment.

Scalable embedded enterprise applications are embedded enterprise applications which are split into multiple components, including a core component and one or more dependent components, with the dependent components being device-specific or device-independent. A scalable embedded enterprise application is embedded with a smaller footprint than a monolithic embedded enterprise application, as the factory or other process which produces an IT asset only needs to include the core component of the scalable embedded enterprise application in the IT asset. The core component has two functions: (1) understanding messages received from smart remediation logic of an intelligence engine at an enterprise support platform and performing actions according to the received messages; and (2) delivering messages to the intelligence engine at the enterprise support platform based on actions taken on the IT asset where the core component of the scalable embedded enterprise application runs. FIG. 10 shows a system 1000, including a computing site 1001 (e.g., customer premises) including a plurality of IT assets, including storage devices 1003, computing devices 1005 and networking devices 1007. The storage devices 1003 run scalable embedded enterprise applications 1030, the computing devices 1005 run scalable embedded enterprise applications 1050, and the networking devices 1007 run scalable embedded enterprise applications 1070. The scalable embedded enterprise applications 1030, 1050, 1070 run core components which exchange messages, via one or more optional firewalls 1009, with an enterprise support platform 1011.

The technical solutions described herein provide novel methods for creating real-time component definitions specifying components which are needed at a scalable embedded enterprise application based on the predicted device state of an IT asset on which the scalable embedded enterprise application runs. The technical solutions also provide functionality for intelligently expanding and reducing the footprint of a scalable embedded enterprise application by tapping into device telemetry and predicting future device states using Markov chains. In this way, the technical solutions are able to optimize utilization of storage space and resource consumption on IT assets which run the scalable embedded enterprise applications (e.g., by running device-specific components of the scalable embedded enterprise applications only when determined to be necessary based on the device telemetry, predicted device state, a support database, etc.).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic adjustment of components running as part of embedded applications deployed on information technology assets will now be described in greater detail with reference to FIGS. 11 and 12. Although described in the context of system 100, these platforms may also be used to implement at least portions of other information processing systems in other embodiments.

Figure 11:
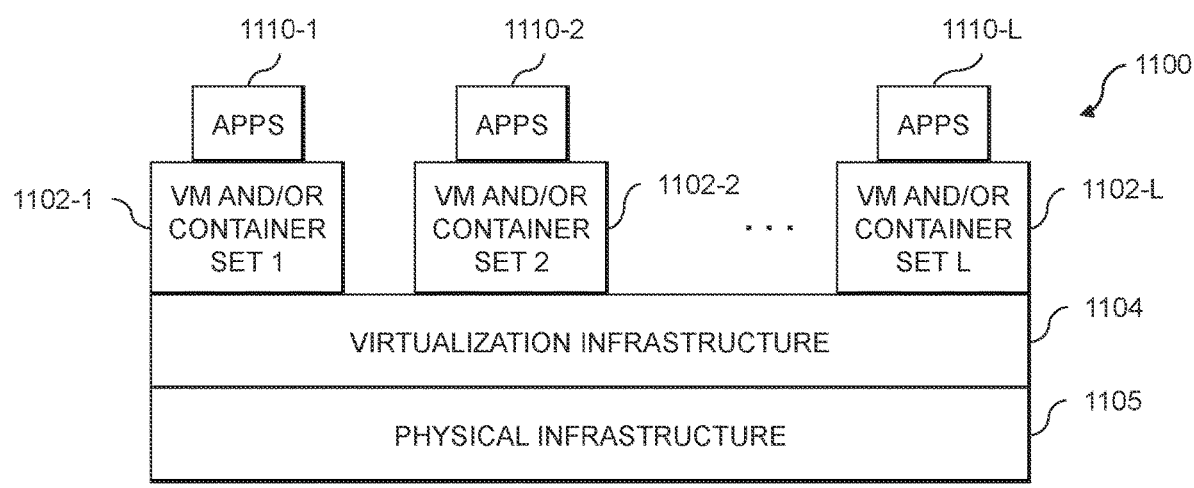
FIGS. 11 and 12 show examples of processing platforms that may be utilized to implement at least a portion of an information processing system in illustrative embodiments.
Figure 12:
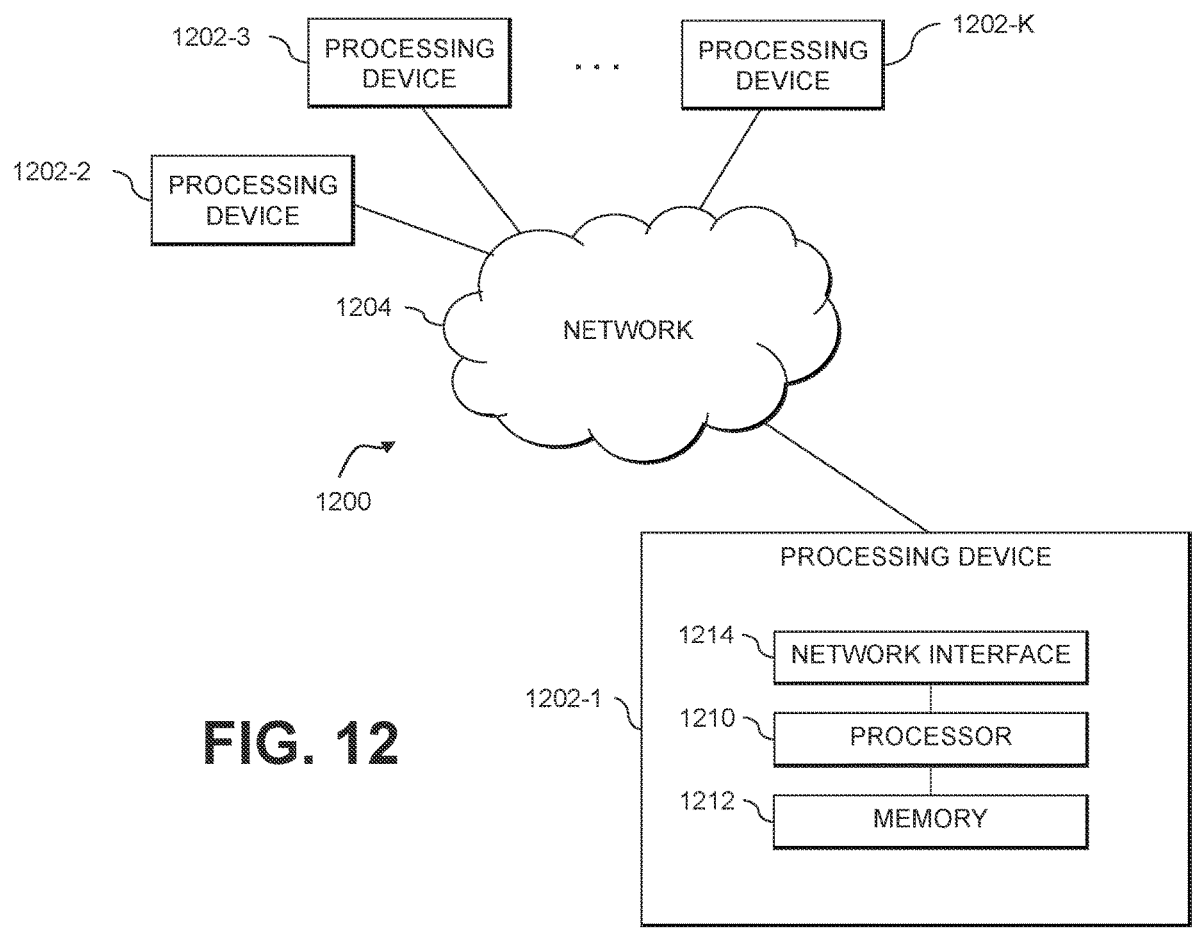

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic adjustment of components running as part of embedded applications deployed on information technology assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing 10 the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to provide telemetry data from a core component of a scalable embedded application deployed on an information technology asset to a support platform, the telemetry data being utilizable for determining a current state of the information technology asset, the scalable embedded application being configured to run the core component and one or more additional components;
   to receive, at the core component of the scalable embedded application deployed on the information technology asset from the support platform, a component definition data structure;
   to parse the component definition data structure to identify a subset of the one or more additional components to be run on the scalable embedded application based at least in part on a predicted future state of the information technology asset, the predicted future state of the information technology asset being determined based at least in part on the determined current state of the information technology asset; and
   to dynamically adjust which of the one or more additional components are run as part of the scalable embedded application based at least in part on the parsing of the component definition data structure.

2. The apparatus of claim 1 wherein the scalable embedded application comprises an enterprise application deployed by an enterprise operating the support platform, the enterprise application providing support services for the information technology asset.

3. The apparatus of claim 1 wherein the scalable embedded application is deployed on one or more hardware components of the information technology asset having a separate storage space.

4. The apparatus of claim 1 wherein the telemetry data is provided at least one of: at regular intervals; and in response to an alert triggered by the scalable embedded application or the support platform.

5. The apparatus of claim 1 wherein the current state of the information technology asset is further determined based at least in part on at least one of: one or more alerts generated by at least one of the scalable embedded application and the support platform; and information regarding historical issues encountered on a plurality of information technology assets stored in a support database.

6. The apparatus of claim 1 wherein the predicted future state of the information technology asset is generated based at least in part using a Markov chain characterizing transitions between states based at least in part on the current state of the information technology asset and one or more previous states of the information technology asset.

7. The apparatus of claim 1 wherein the component definition data structure is in a JavaScript Object Notation format.

8. The apparatus of claim 1 wherein the component definition data structure specifies, for each component in the subset of the one or more additional components to be run on the scalable embedded application:
   a component name;
   a component type; and
   component dependencies.

9. The apparatus of claim 8 wherein the component type of a given component comprises one of:
   a device-specific component type that must be run on the scalable embedded application deployed on the information technology asset; and
   a device-independent component type that may be run external to the information technology asset.

10. The apparatus of claim 1 wherein dynamically adjusting which of the one or more additional components are run as part of the scalable embedded application based at least in part on the parsing of the component definition data structure comprises:
  downloading device-specific ones of the identified subset of the one or more additional components which are not already running as part of the scalable embedded application; and
  running the device-specific ones of the identified subset of the one or more additional components as part of the scalable embedded application.

11. The apparatus of claim 10 wherein the device-specific ones of the identified subset of the one or more additional components which are not already running as part of the scalable embedded application are downloaded from one or more edge computing devices coupled between the information technology asset and the support platform.

12. The apparatus of claim 1 wherein dynamically adjusting which of the one or more additional components are run as part of the scalable embedded application based at least in part on the parsing of the component definition data structure comprises running device-independent ones of the identified subset of the one or more additional components at an additional information technology asset.

13. The apparatus of claim 12 wherein the additional information technology asset comprises one or more edge computing devices coupled between the information technology asset and the support platform.

14. The apparatus of claim 1 wherein dynamically adjusting which of the one or more additional components are run as part of the scalable embedded application based at least in part on the parsing of the component definition data structure comprises uninstalling one or more of the identified subset of the one or more additional components currently running as part of the scalable embedded application which are not specified in the component definition data structure.

15. A computer program product comprising a non-transitory processor-readable storage medium having stored therein program code of one or more software programs, wherein the program code when executed by at least one processing device causes the at least one processing device:
  to provide telemetry data from a core component of a scalable embedded application deployed on an information technology asset to a support platform, the telemetry data being utilizable for determining a current state of the information technology asset, the scalable embedded application being configured to run the core component and one or more additional components;
  to receive, at the core component of the scalable embedded application deployed on the information technology asset from the support platform, a component definition data structure;
  to parse the component definition data structure to identify a subset of the one or more additional components to be run on the scalable embedded application based at least in part on a predicted future state of the information technology asset, the predicted future state of the information technology asset being determined based at least in part on the determined current state of the information technology asset; and
  to dynamically adjust which of the one or more additional components are run as part of the scalable embedded application based at least in part on the parsing of the component definition data structure.

16. The computer program product of claim 15 wherein dynamically adjusting which of the one or more additional components are run as part of the scalable embedded application based at least in part on the parsing of the component definition data structure comprises:
  downloading device-specific ones of the identified subset of the one or more additional components which are not already running as part of the scalable embedded application;
  running the device-specific ones of the identified subset of the one or more additional components as part of the scalable embedded application; and
  running device-independent ones of the identified subset of the one or more additional components at an additional information technology asset.

17. The computer program product of claim 15 wherein dynamically adjusting which of the one or more additional components are run as part of the scalable embedded application based at least in part on the parsing of the component definition data structure comprises uninstalling one or more of the identified subset of the one or more additional components currently running as part of the scalable embedded application which are not specified in the component definition data structure.

18. A method comprising:
  providing telemetry data from a core component of a scalable embedded application deployed on an information technology asset to a support platform, the telemetry data being utilizable for determining a current state of the information technology asset, the scalable embedded application being configured to run the core component and one or more additional components;
  receiving, at the core component of the scalable embedded application deployed on the information technology asset from the support platform, a component definition data structure;
  parsing the component definition data structure to identify a subset of the one or more additional components to be run on the scalable embedded application based at least in part on a predicted future state of the information technology asset, the predicted future state of the information technology asset being determined based at least in part on the determined current state of the information technology asset; and
  dynamically adjusting which of the one or more additional components are run as part of the scalable embedded application based at least in part on the parsing of the component definition data structure;
  wherein the method is performed by at least one processing device comprising a processor coupled to a memory.

19. The method of claim 18 wherein dynamically adjusting which of the one or more additional components are run as part of the scalable embedded application based at least in part on the parsing of the component definition data structure comprises:
  downloading device-specific ones of the identified subset of the one or more additional components which are not already running as part of the scalable embedded application;
  running the device-specific ones of the identified subset of the one or more additional components as part of the scalable embedded application; and
  running device-independent ones of the identified subset of the one or more additional components at an additional information technology asset.

20. The method of claim 18 wherein dynamically adjusting which of the one or more additional components are run as part of the scalable embedded application based at least in part on the parsing of the component definition data structure comprises uninstalling one or more of the identified one or more additional components currently running as part of the scalable embedded application which are not specified in the component definition data structure.

\* \* \* \* \*